(12) United States Patent
Acar et al.

(10) Patent No.: US 8,113,050 B2
(45) Date of Patent: Feb. 14, 2012

(54) ROBUST SIX DEGREE-OF-FREEDOM MICROMACHINED GYROSCOPE WITH ANTI-PHASE DRIVE SCHEME AND METHOD OF OPERATION OF THE SAME

(75) Inventors: Cenk Acar, Irvine, CA (US); Andrei Shkel, Irvine, CA (US); Adam R. Schofield, Irvine, CA (US); Lynn E. Costlow, Clayton, CA (US); Asad M. Madni, Los Angeles, CA (US)

(73) Assignee: The Regents of the University of California, Oakland, CA (US)

( * ) Notice: Subject to any disclaimer, the term of this patent is extended or adjusted under 35 U.S.C. 154(b) by 653 days.

(21) Appl. No.: 12/279,174

(22) PCT Filed: Jan. 25, 2006

(86) PCT No.: PCT/US2006/002772
§ 371 (c)(1),
(2), (4) Date: Jan. 14, 2009

(87) PCT Pub. No.: WO2007/086849
PCT Pub. Date: Aug. 2, 2007

(65) Prior Publication Data
US 2009/0272189 A1    Nov. 5, 2009

(51) Int. Cl.
*G01P 9/04* (2006.01)
*G01C 19/00* (2006.01)

(52) U.S. Cl. .................................. 73/504.04; 73/504.12

(58) Field of Classification Search ............... 73/504.12, 73/504.04, 504.14, 504.16, 504.02, 510, 73/511
See application file for complete search history.

(56) References Cited

U.S. PATENT DOCUMENTS

| | | | |
|---|---|---|---|
| 6,250,156 B1 * | 6/2001 | Seshia et al. ............... | 73/504.12 |
| 6,481,283 B1 * | 11/2002 | Cardarelli ................... | 73/504.02 |
| 6,845,669 B2 * | 1/2005 | Acar et al. .................. | 73/504.14 |
| 6,848,304 B2 * | 2/2005 | Geen ........................... | 73/504.04 |
| 6,859,751 B2 * | 2/2005 | Cardarelli ..................... | 702/141 |
| 7,284,430 B2 * | 10/2007 | Acar et al. .................. | 73/504.12 |
| 7,421,898 B2 * | 9/2008 | Acar et al. .................. | 73/504.12 |

* cited by examiner

*Primary Examiner* — Helen C. Kwok
(74) *Attorney, Agent, or Firm* — Marcus C. Dawes; Daniel L. Dawes

(57) ABSTRACT

A method of operating an anti-phase six degree-of-freedom tuning fork gyroscope system comprises the steps of driving a first three degree-of-freedom gyroscope subsystem, and driving a second three degree-of freedom gyroscope subsystem in an anti-phase mode with the first gyroscope subsystem at an anti-phase resonant frequency. Acceleration or an angular rate of motion is sensed by the first and second three degree-of-freedom gyroscope subsystems operating in a flat frequency response range where the anti-phase resonant frequency is designed. Response gain and phase are stable and environmental and fabrication perturbations are avoided by such operation. A anti-phase six degree-of-freedom tuning fork gyroscope system which operates as described is also characterized.

39 Claims, 14 Drawing Sheets

ROBUST SIX DEGREE-OF-FREEDOM MICROMACHINED GYROSCOPE WITH ANTI-PHASE DRIVE SCHEME AND METHOD OF OPERATION OF THE SAME

BACKGROUND OF THE INVENTION

1. Field of the Invention

The invention relates to the field of micromachined gyroscopes and accelerometers, and in particular to designs for anti-phase devices to compensate for fabrication and environmental variations.

2. Description of the Prior Art

In recent years, the development of microelectromechanical systems (MEMS) and the improvement of fabrication techniques have opened new avenues for the development of low-cost sensors. This is especially true for inertial sensors, more specifically micromachined gyroscopes which have shown enormous potential for a wide range of applications.

When two masses are oscillating with a 180 degrees phase difference, they are considered to be moving in opposite directions. This type of motion is referred to as "anti-phase," since they are oscillating out of phase with exact opposite motion paths. Typically, this technique is employed in the drive direction of vibratory gyroscopic devices which have come to be known as tuning fork gyroscopes. The advantage of such devices is that the induced sense response due to the input angular rate will also be an anti-phase oscillatory motion among the two masses. This means that inputs such as environmental noise and acceleration loads, which cause the masses to respond in phase (called common mode inputs), can be cancelled by utilizing differential sensing techniques.

One drawback to such a device is that the motion of both the drive and sense masses must be precisely in anti-phase so that the device can indeed reject common mode stimuli. In practice, due to inevitable imperfections in the mechanical structure, there are issues with maintaining precise anti-phase motion in both the drive and the sense directions. Methods for achieving this motion in the drive direction have been proposed including device designs and control architectures that force anti-phase motion, but this adds complexity to the system.

Another problem that is often overlooked in tuning fork devices is maintaining the anti-phase response of the sense mode, specifically the potentially large phase variations that can occur when operating at or very near resonant frequencies. A method of avoiding this phase stability issue in both drive and sense is to operate the device off resonance where the phase remains relatively unchanged for small frequency fluctuations. However, the sensitivity of the device is sacrificed drastically when advantage of sense-mode resonance is not utilized.

What is needed is a gyroscope design that alleviates problems commonly seen in conventional devices.

BRIEF SUMMARY OF THE INVENTION

The illustrated embodiment of the invention introduces a multi-degree of freedom design approach to gyroscope devices that are driven in anti-phase for the passive relaxation of sense mode phase matching requirements. A six degree-of-freedom micromachined gyroscope with anti-phase drive for the measurement of angular rate is disclosed. The gyroscope is comprised of two three degree-of-freedom (3-DOF) subsystems coupled in the drive-mode and driven into anti-phase oscillation to effectively or substantially reject common-mode stimuli. Each of the 3-DOF subsystems contains two proof masses that form a 1-DOF drive oscillator and 2-DOF sense oscillator, mechanically decoupled via a decoupling frame. The two 1-DOF drive oscillators are connected together with a flexure, thus making the overall drive a 2-DOF coupled system. Directly coupling the two drive subsystems provides a common anti-phase drive-mode resonant frequency, at which the two gyroscopic subsystems naturally oscillate in opposite directions. The 2-DOF sense-mode oscillators of each gyroscopic subsystem provide a flat range in their frequency response, where the response gain and phase are stable. The gain and phase stability of this range leads to robustness to imperfections and environmental influences, and provides precise matching of sense-mode amplitude and phase of the two gyroscopic subsystems.

In the illustrated design, the flat frequency response ranges of each 2-DOF sense-mode oscillators are overlapped, and the anti-phase drive resonant frequency (at which the overall device is operated) is located within the overlapping flat ranges. The resulting six-degree of freedom dynamical system eliminates amplitude and phase stability problems of conventional tuning-fork micromachined gyroscopes to minimize bias and effectively reject common-mode stimuli.

While the apparatus and method has or will be described for the sake of grammatical fluidity with functional explanations, it is to be expressly understood that the claims, unless expressly formulated under 35 USC 112, are not to be construed as necessarily limited in any way by the construction of "means" or "steps" limitations, but are to be accorded the full scope of the meaning and equivalents of the definition provided by the claims under the judicial doctrine of equivalents, and in the case where the claims are expressly formulated under 35 USC 112 are to be accorded full statutory equivalents under 35 USC 112. The invention can be better visualized by turning now to the following drawings wherein like elements are referenced by like numerals.

BRIEF DESCRIPTION OF THE DRAWINGS

FIG. 2a is uncoupled, and FIG. 2b is weakly-coupled.

The invention and its various embodiments can now be better understood by turning to the following detailed description of the preferred embodiments which are presented as illustrated examples of the invention defined in the claims. It is expressly understood that the invention as defined by the claims may be broader than the illustrated embodiments described below.

DETAILED DESCRIPTION OF THE PREFERRED EMBODIMENTS

The problem to which the illustrated invention is addressed is the susceptibility of the sense-mode response amplitude and phase of conventional micromachined gyroscopes to environmental and fabrication variations. A conventional gyroscope is typically comprised of a mass (or masses) constrained to move in two modes: the drive and sense directions, assumed by convention to the x and y directions respectively in a planar coordinate reference frame. It is assumed that there is no motion in the direction orthogonal to these modes and thus has two degrees of freedom. The drive and sense modes are orthogonal to each other so that when the mass is driven by forced vibration, there should be no motion in the sense direction. The sense mode is excited by the sinusoidal Coriolis force induced in the presence of an angular rate orthogonal to both the drive and sense directions. The amount of the sense mode response is directly related to the drive velocity, the input angular rate, and the dynamic response of the sense mode to the induced frequency of vibration.

Figure 2A:
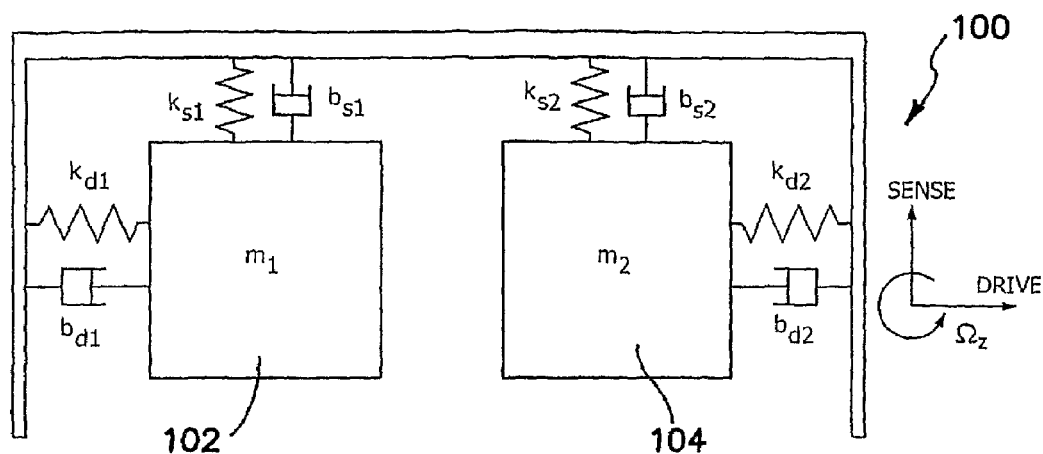
FIGS. 2a and 2b are schematic dynamical models of conventional anti-phase gyroscopes.

Before considering the illustrated embodiment of the invention, turn first to an illustration of the problem solved by the invention as exemplified in the prior art tuning fork gyroscope 100 shown in FIGS. 2a-4. FIGS. 2a and 2b are schematic dynamical models of conventional anti-phase gyroscopes. FIG. 2a is uncoupled, and FIG. 2b is weakly-coupled. In a conventional anti-phase device 100, there are essentially two conventional gyroscope systems driven in opposite directions. A conventional tuning-fork gyroscope device 100 is generally formed by two proof-masses 102, 104, each free to move in the drive and sense directions. Thus, the device 100 becomes a four degree of freedom (4-DOF) device since there are now four independent motions: two drive and two sense displacements. The device 100 as pictured in FIGS. 2a and 2b responds to the rotational rate denoted by $\Omega_z$ which is an in-plane rotation represented by an angular velocity vector pointing into or out of the page of the illustration of FIGS. 2a and 2b. It must be noted that the schematic is just one implementation; by changing the driving or sensing direction from in-plane to out-of-plane, the device 100 could be altered to detect angular rate inputs in other directions. Also, a mode decoupling could be employed to help minimize quadrature error which is the introduction of drive motion into the sense direction.

Figure 2B:
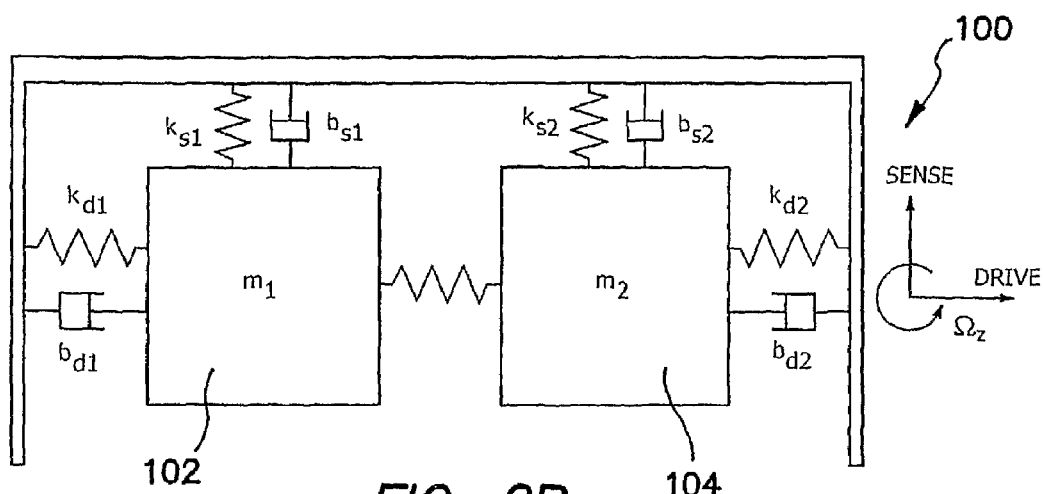
Figure 3A:
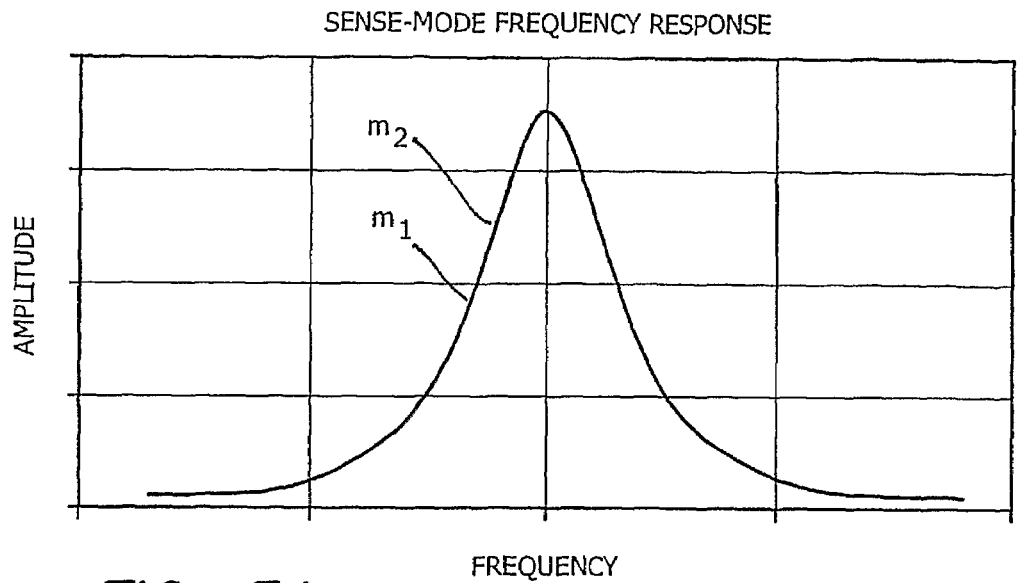
FIG. 3 is a pair of graphs showing the sense-mode frequency response of an ideal conventional anti-phase gyroscope, with exactly matched sense-mode resonant frequencies of the two masses. The upper graph shows the amplitude as a function of frequency and the lower graph shows the phase as a function of frequency.
Figure 3B:
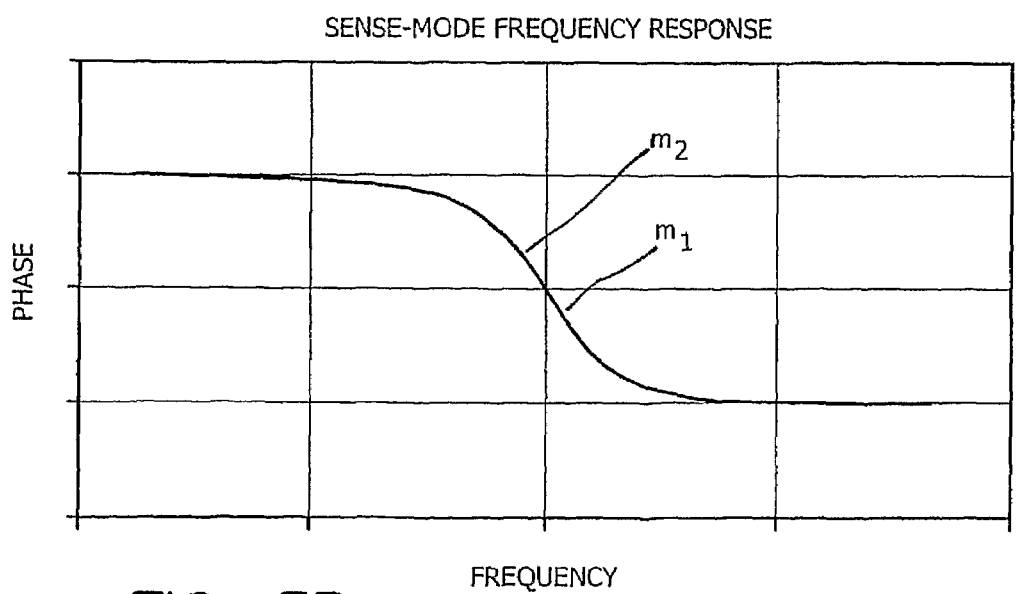

An anti-phase device can also consist of two masses 102, 104 directly coupled together. Using FIGS. 2a and 2b as a guide, the dynamic equations governing the motion of the masses can be written using a lumped mass assumption $$m_1 \ddot{x}_1 + b_{d1} \dot{x}_1 + k_{d1} x_1 = F_d \sin(\omega_d t)$$

$$m_1 \ddot{y}_1 + b_{s1} \dot{y}_1 + k_{s1} y_1 = -2\Omega_z m_1 \dot{x}_1$$

$$m_2 \ddot{x}_2 + b_{d2} \dot{x}_2 + k_{d2} x_2 = F_d \sin(\omega_d t + \pi)$$

$$m_2 \ddot{y}_2 + b_{s2} \dot{y}_2 + k_{s2} y_2 = -2\Omega_z m_2 \dot{x}_2$$

where x and y are the horizontal and vertical axes in the plane of FIGS. 2a and 2b, $k_{d1}$, $k_{d2}$ are the drive direction spring constants associated with mass $m_1$, 102 and mass $m_2$, 104 respectively, $k_{s1}$, $k_{s2}$ are the sense direction spring constants associated with mass 102 and mass 104 respectively, $b_{d1}$, $b_{d2}$ are the drive direction damping constants associated with mass 102 and mass 104 respectively, $b_{s1}$, $b_{s2}$ are the sense direction damping constants associated with mass 102 and mass 104 respectively, $F_d$ is the amplitude of the forcing function, $\omega_d$ is the drive frequency, t is time and the dots and double dots are the first and second time derivatives as per conventional notation.

The dynamic equations defined in equation (1) are differential equations for the two independent motions of the two masses 102 and 104. Each mass 102, 104 is driven into vibration with an oscillatory force of constant amplitude at some driving frequency; the main difference is that the second mass is driven with a phase shift of π radians. The sense mode is excited by the Coriolis force induced in the presence of a non-zero $\Omega_z$ angular rate. If the masses are weakly coupled in the drive-mode, the elastic coupling force $k_{d\text{-}int}$ $(x_2-x_1)$ between the two masses 102, 104 is added into the drive-mode equations of motion.

For a conventional gyroscope 100, the natural frequencies in the drive and sense direction are typically designed to be closely matched; this allows the gyroscope 100 to have maximum sensitivity to angular rate inputs. For an anti-phase device, the natural frequencies of the second mass 104 are also typically designed to match those of the first mass 102. The frequency response characteristics of an ideal tuning-fork gyroscope system 100 is presented in FIG. 3 which is a pair of graphs showing the amplitude and phase as a function of frequency, where the sense resonance frequencies of the two masses 102, 104 are exactly matched. For this ideal system 100, the drive and sense-mode responses of the two masses 102, 104 are precisely in anti-phase as required for proper operation of a tuning fork gyroscope.

Figure 4A:
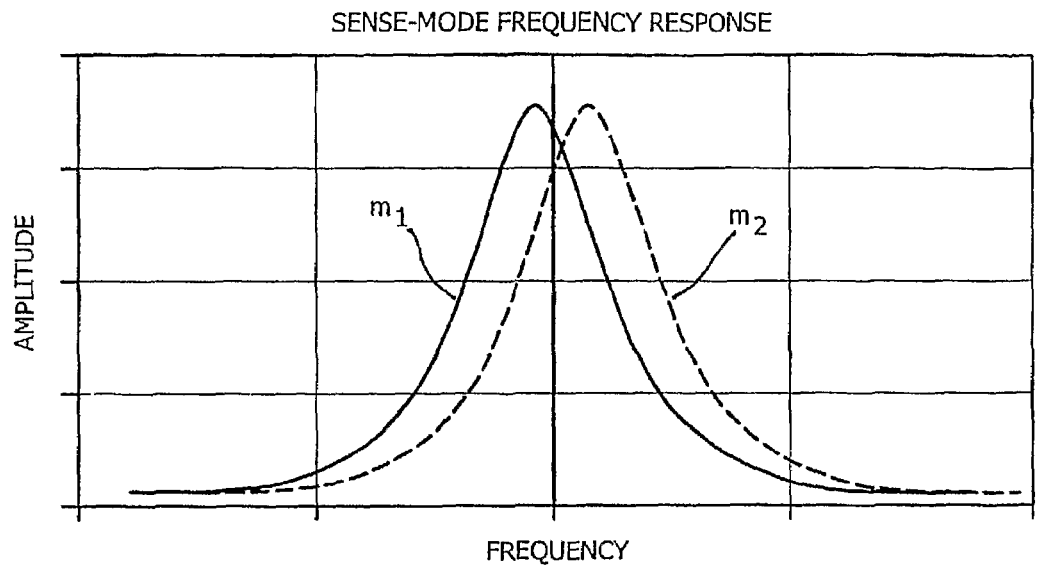
FIG. 4 is a pair of graphs corresponding to FIG. 3 in which the sense-mode resonant frequencies of the two masses of an actual conventional anti-phase gyroscope are slightly mismatched.
Figure 4B:
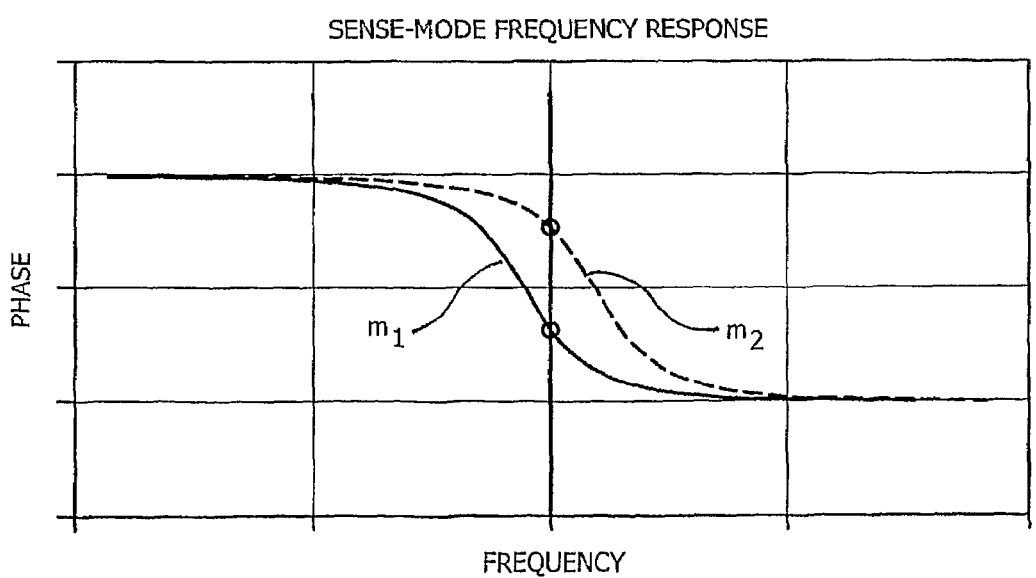

In practice however, the designed and actual frequencies are generally not the same. This frequency alteration can occur due to errors inherent in materials and fabrication, as well as errors introduced during operation by environmental fluctuations such as temperature or pressure. These errors will cause random resonant frequency shifts, resulting in differences in drive and sense-mode resonance frequencies between the two masses 102, 104 as shown in the graphs of FIG. 4. Assuming the drive motion is regulated by the control electronics such that both masses 102, 104 are driven perfectly anti-phase with equal amplitudes, the Coriolis force induced on the two masses 102, 104 will be of same amplitude and frequency, and in opposite directions.

When the sense-mode resonance frequencies of the two masses 102, 104 are slightly different, the Coriolis excitation will fall in different ranges of their response curve. Thus, the two masses 102, 104 will respond to the same excitation with different amplitude and phase. Consequently, the sense-mode response of the two masses 102, 104 will not be precisely in opposite directions and the same amplitude. This results in a large bias when a differential detection scheme is used. The capability of the tuning-fork gyroscope 100 to reject environmental factors as a common-mode is also diminished.

Figure 5:
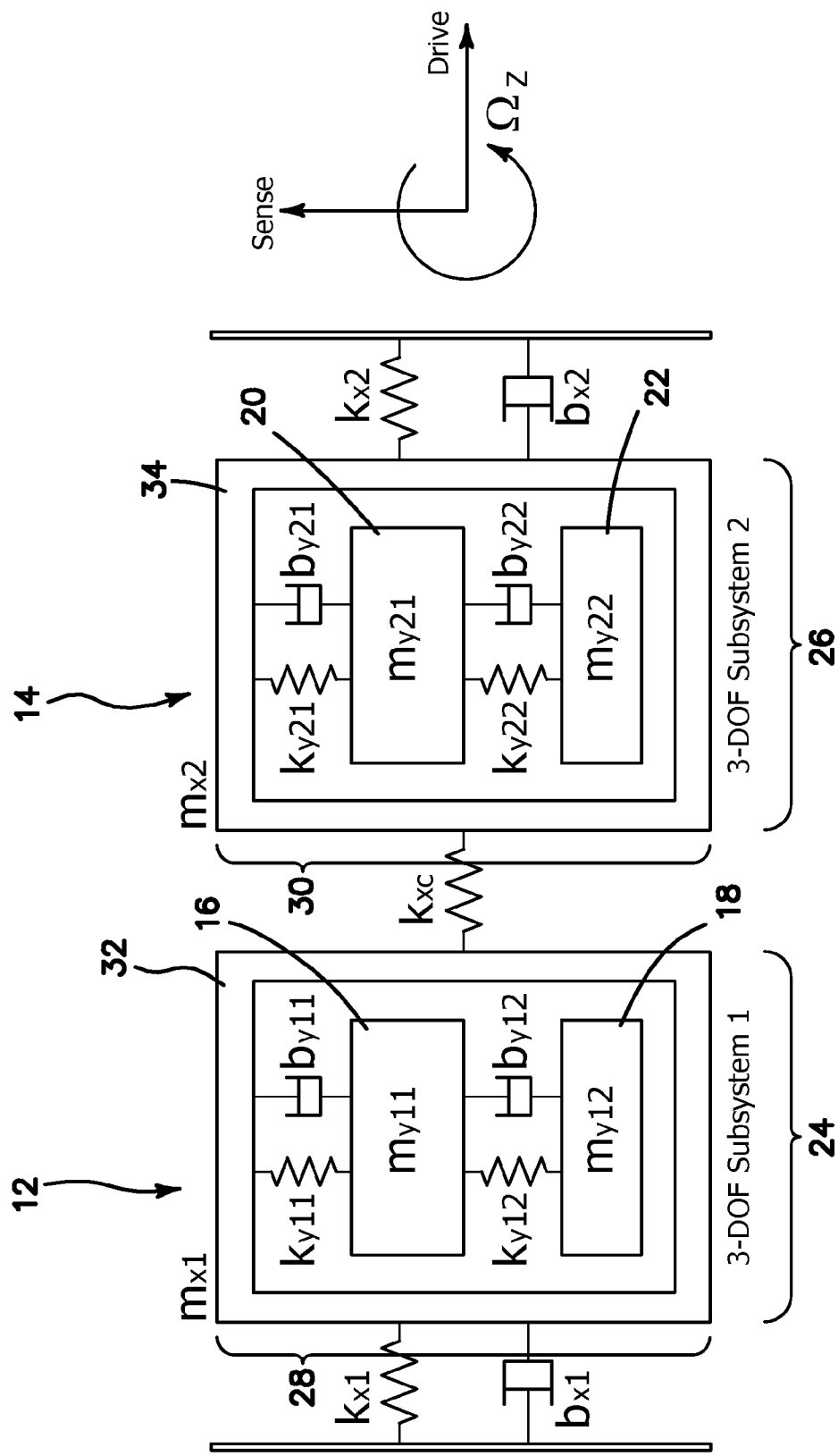
FIG. 5 is a schematic of a dynamical model of the 6-DOF anti-phase gyroscope system of the illustrated embodiment.

The anti-phase six degree-of-freedom tuning fork gyroscope system of the illustrated embodiment shown in the schematic of FIG. 5 is comprised of two 3-DOF subsystems 12, 14 coupled together in the x drive direction thereby making the complete device a 6-DOF anti-phase driven system 10. Each 3-DOF subsystem 12, 14 is comprised of two interconnected pairs of proof-masses 16 and 18, 20 and 22 respectively. In the sense-mode, the proof masses 16 and 18, 20 and 22 are mechanically coupled to form a corresponding 2-DOF sense mode oscillator 14, 26 respectively. In the drive-mode, the masses 16 and 18, 20 and 22 move together as a single body, each pair of masses forming a 1-DOF drive oscillator 28, 30 respectively. In the illustrated embodiment of FIGS. 1a-1c frames 32 and 34 are coupled by means of flexures 70 to anchors 72 connected to a substrate (not shown) and restrained to move only in the x drive direction. Mass 16 and mass 18 are restrained to move in the y sense direction and are coupled together by flexures 74. Similarly, mass 20 and mass 22 are restrained to move in the y sense direction and are coupled together by flexures 76. Mass 16 is coupled to frame 32 by flexures 78. Mass 20 is coupled to frame 34 by flexures 80. Damping occurs in device 10 by means of friction with air or the containment gas, even though such friction is reduced by packaging within a partial vacuum, and by means of the partial inelasticity of the material of which device 10 is made.

Figure 6A:
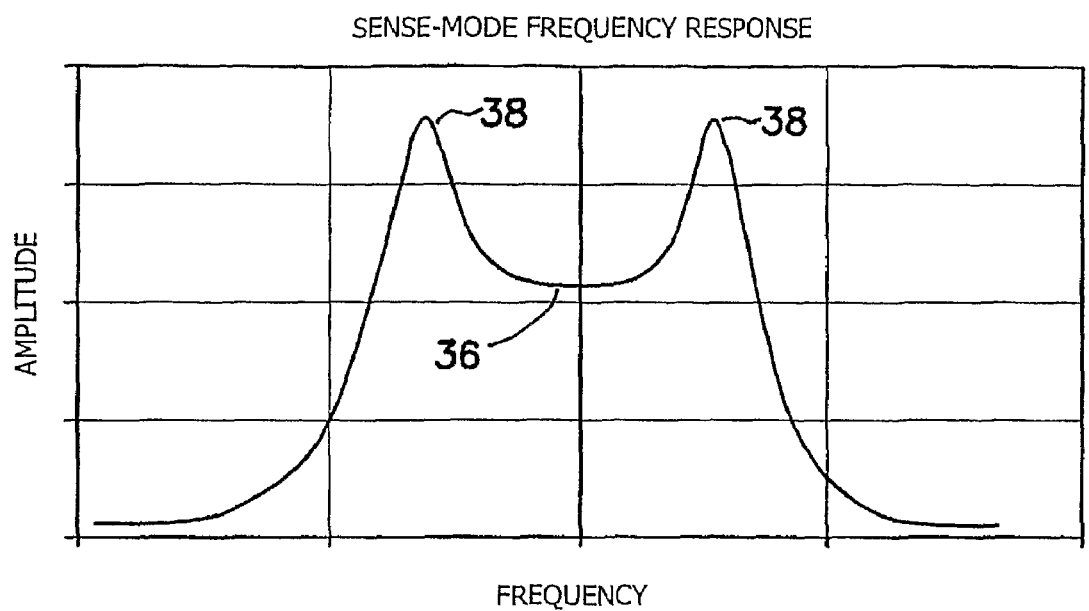
FIG. 6 is a graph of the response curves of the illustrated embodiment, wherein in the upper graph amplitude is shown as a function of frequency and in the lower graph phase is shown as a function of frequency.
Figure 6B:
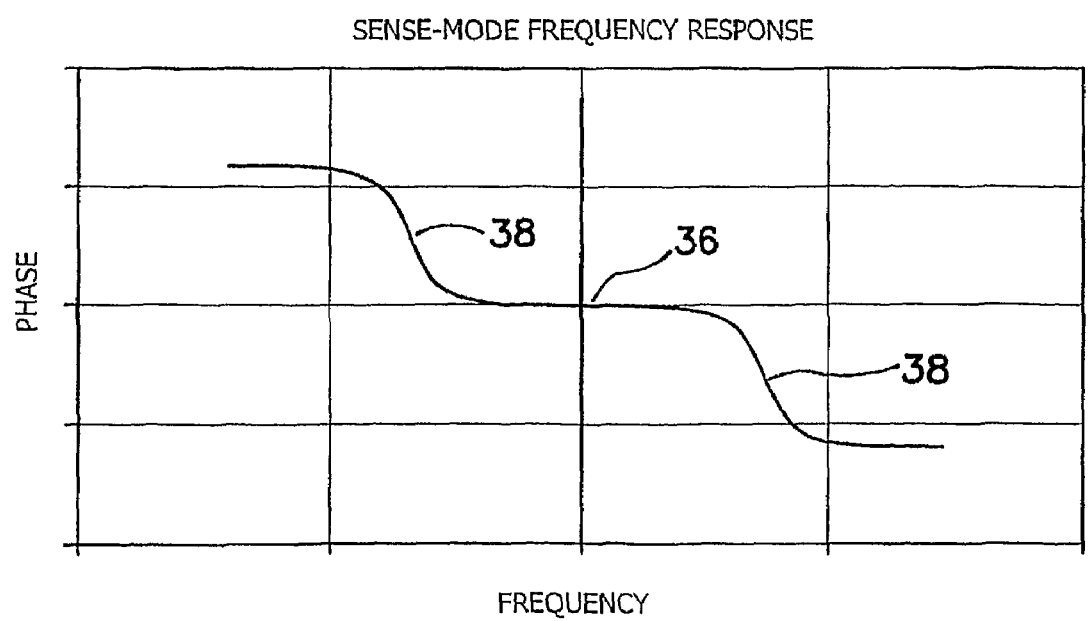

To minimize quadrature error, a corresponding decoupling frame 32, 34 that is free to move only in the x drive-direction is used, to mechanically decouple the x drive oscillations from the 2-DOF y sense mode. Thus, a total of four proof masses 16 18, 20 and 22 form an overall 2-DOF drive system 24, 26 and two separate 2-DOF sense oscillators 28, 30. The resulting gyroscope dynamical system 10 becomes 6-DOF. The 2-DOF drive system 24, 26 results in two primary resonance modes: the in-phase and the anti-phase modes. In the x drive-mode, the overall device 10 is nominally driven at the antiphase resonant frequency of the 2-DOF drive oscillator 24, 26 by a drive means which is comprised of conventional comb drive electrodes 66 shown in FIGS. 1a-1c and conventional drive circuitry (not shown). Thus, the two gyroscopic subsystems 12, 14 oscillate in opposite directions in x drive direction. The 2-DOF sense-mode oscillator 28, 30 of each gyroscopic subsystem 12, 14 respectively provides a flat range 36 between two resonant peaks 38 in their frequency response as generated by sensing electrodes 68 shown in FIGS. 1a-1c and conventional sensing circuitry (not shown) and as graphically illustrated in FIG. 6, wherein in the upper graph amplitude is shown as a function of frequency and in the lower graph phase is shown as a function of frequency. Within this flat range 36, the response gain and phase are stable. This means that if either the operation frequency or the location of resonant peaks 38 changes, the resulting response gain and phase stays constant.

The gain and phase stability of range 36 leads to robustness to imperfections and environmental influences, and minimizes the sensitivity of the scale factor to relative location of drive and sense resonant frequencies. The device 10 is operated in the flat range 36 of the response curve, where the amplitude and phase of the sensing mass is constant. The phase stability of the 2-DOF sense-mode oscillators 28, 30 assures that the sense-mode responses of the two gyroscopic systems 12, 14 are precisely anti-phase for a wide frequency range. This eliminates the major challenge of phase matching requirements in typical tuning fork systems, which usually requires the two sense-oscillators 28, to be mechanically coupled.

Figure 7A:
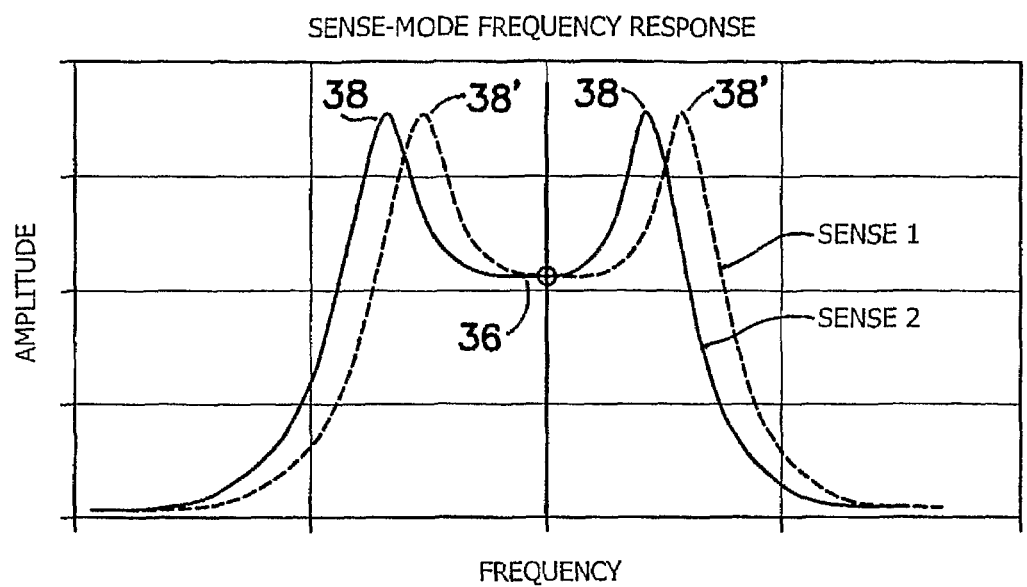
FIG. 7 is a graph of the frequency response curves of the illustrated embodiment similar to FIG. 6 except where the two 2-DOF sense-mode oscillators are mismatched.
Figure 7B:
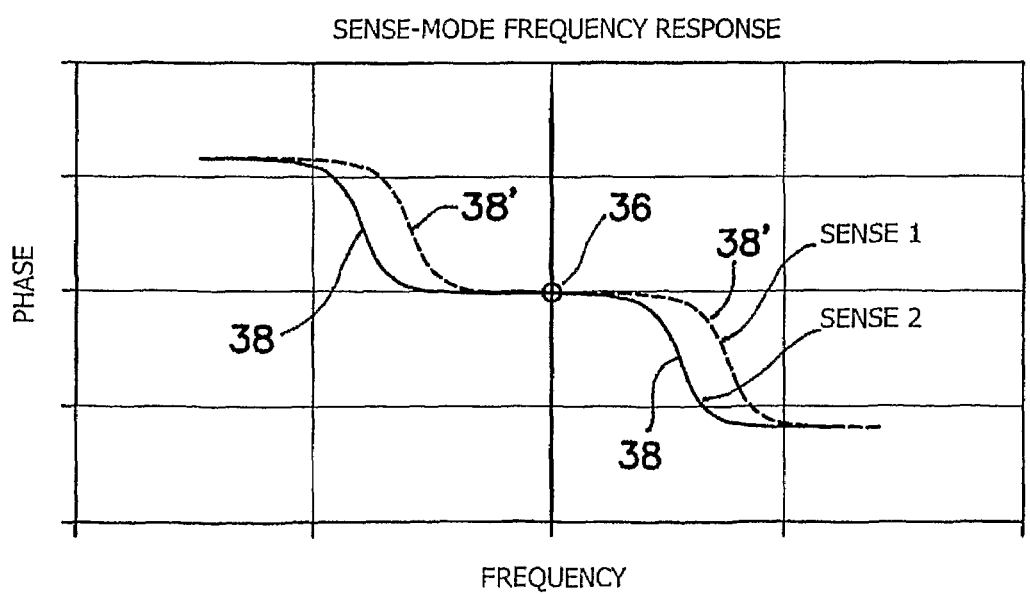

In the graphs of FIG. 7, the case of two mismatched 2-DOF sense-mode oscillators 28, 30 is illustrated. It is observed that even though the location of the two resonance peaks 38 and 38' are shifted among the two 2-DOF oscillators 28, 30 due to parameter variations, the response amplitude and phase of the oscillators 28, 30 in range 36 remain precisely matched. Even though the resonant frequencies have relatively shifted due to imperfections, the response amplitude and phase of the oscillators remain precisely matched.

Figure 8:
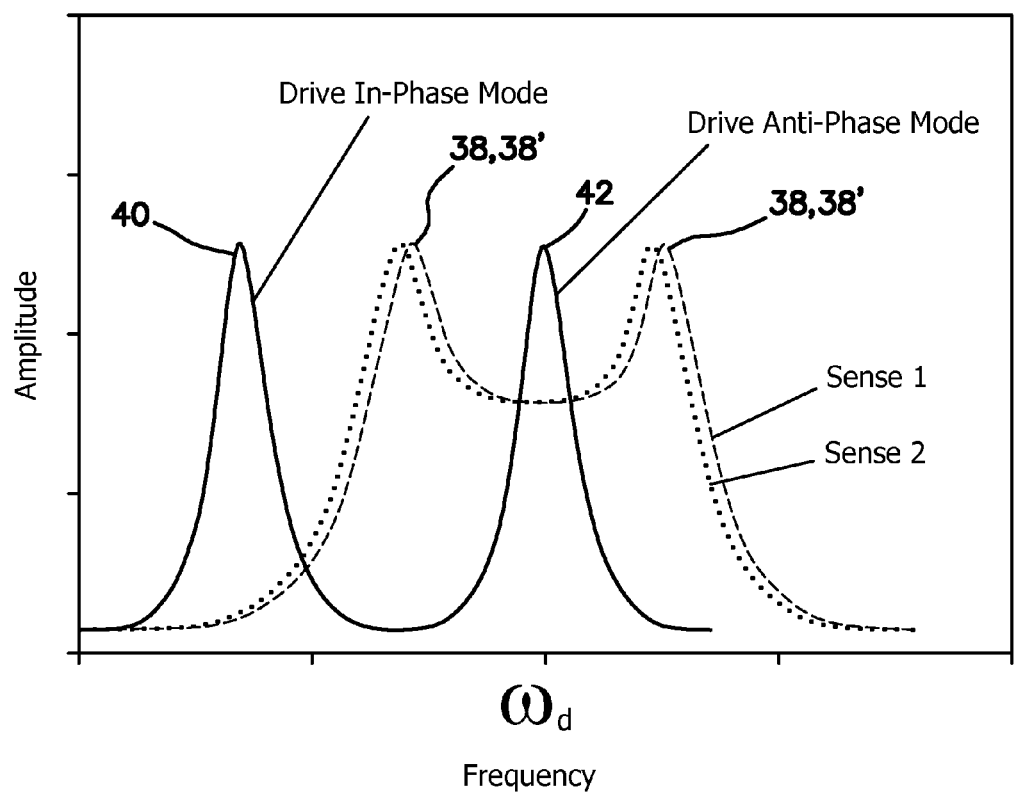
FIG. 8 is a graph of the drive and sense-mode frequency response of the two overall gyroscope system of the illustrated embodiment.

In the nominal design of the illustrated embodiment, the flat ranges 36 of each 2-DOF sense-mode oscillators 28, 30 are overlapped, and the anti-phase drive resonant frequency (at which the overall device is operated) is located within the overlapping flat ranges 36. By designing two identical 2-DOF sense-mode oscillators 28, 30 in the gyroscopic subsystems, the flat ranges 36 will be overlapped. The anti-phase drive mode is nominally designed to be located in the center of the flat ranges 36 as graphically illustrated in FIG. 8. Thus, when the device 10 is driven at the anti-phase drive resonance mode, the operation frequency is within both of the flat ranges 36 of the 2-DOF sense-mode oscillators 28, 30, even in the presence of imperfections. The 2-DOF drive mode results in one in-phase resonant peak 40 and one anti-phase resonant peak 42. The anti-phase resonant peak 42 is located within the two overlapping sense-mode flat ranges 36 with the in-phase resonant peak 40 outside of range 36. In the illustrated embodiment the overlap is substantially total, so that the ranges 36 of sense oscillators 28, 30 are approximately identical. However, it is within the scope of the invention that this overlap need be only partial and have a bandwidth wide enough to allow for the anti-phase drive peak to always securely lie within it. It is also within the scope of the invention that the in-phase resonant peak 42 could be located within the two overlapping sense-mode flat ranges 36 with the anti-phase resonant peak 42 outside of range 36 in application where common mode rejection was not desired.

Figure 1A:
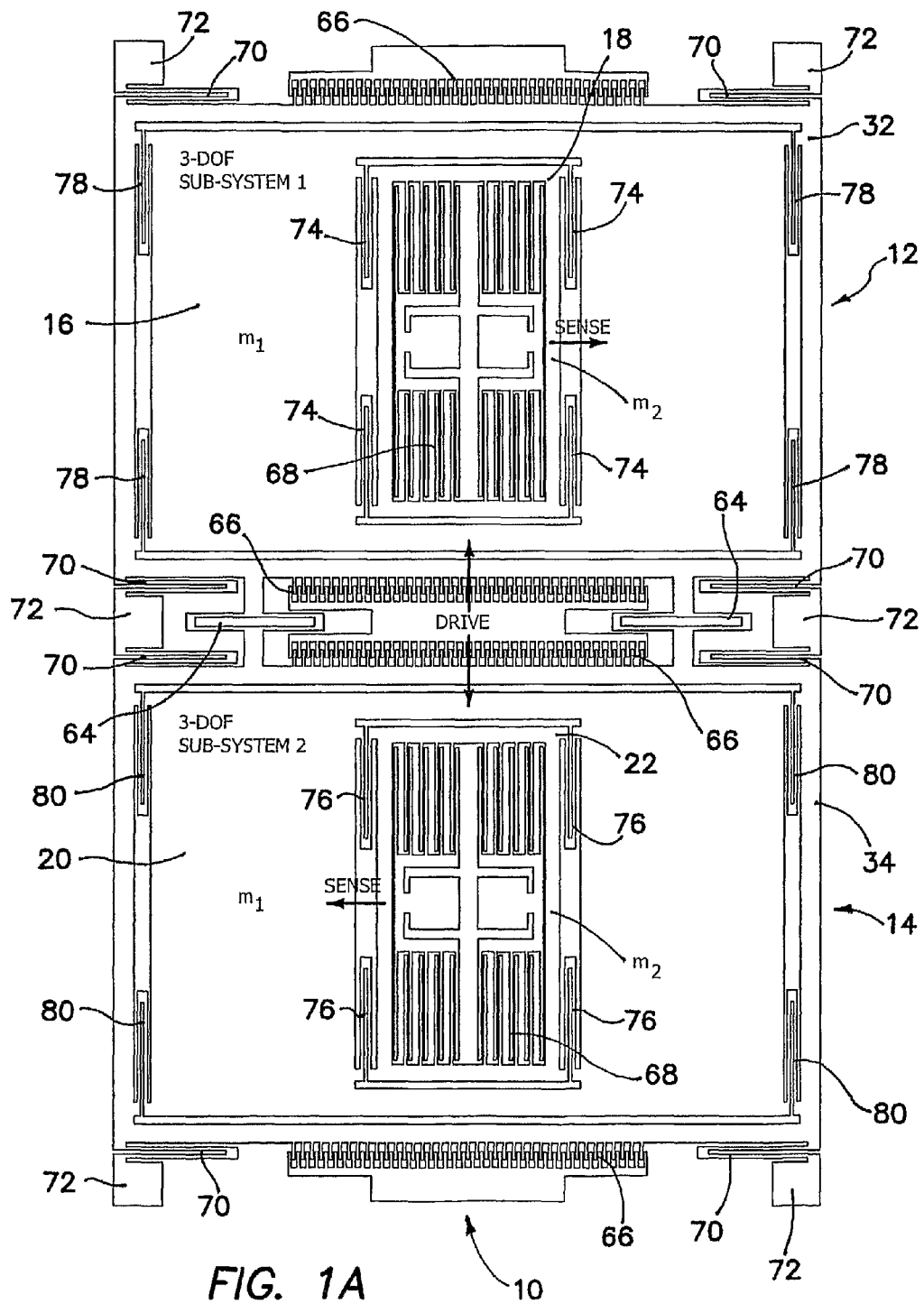
FIG. 1a is a layout diagram of a first embodiment for a gyroscopic system of the invention in which the two gyroscopic subsystems are mechanically coupled.
Figure 1B:
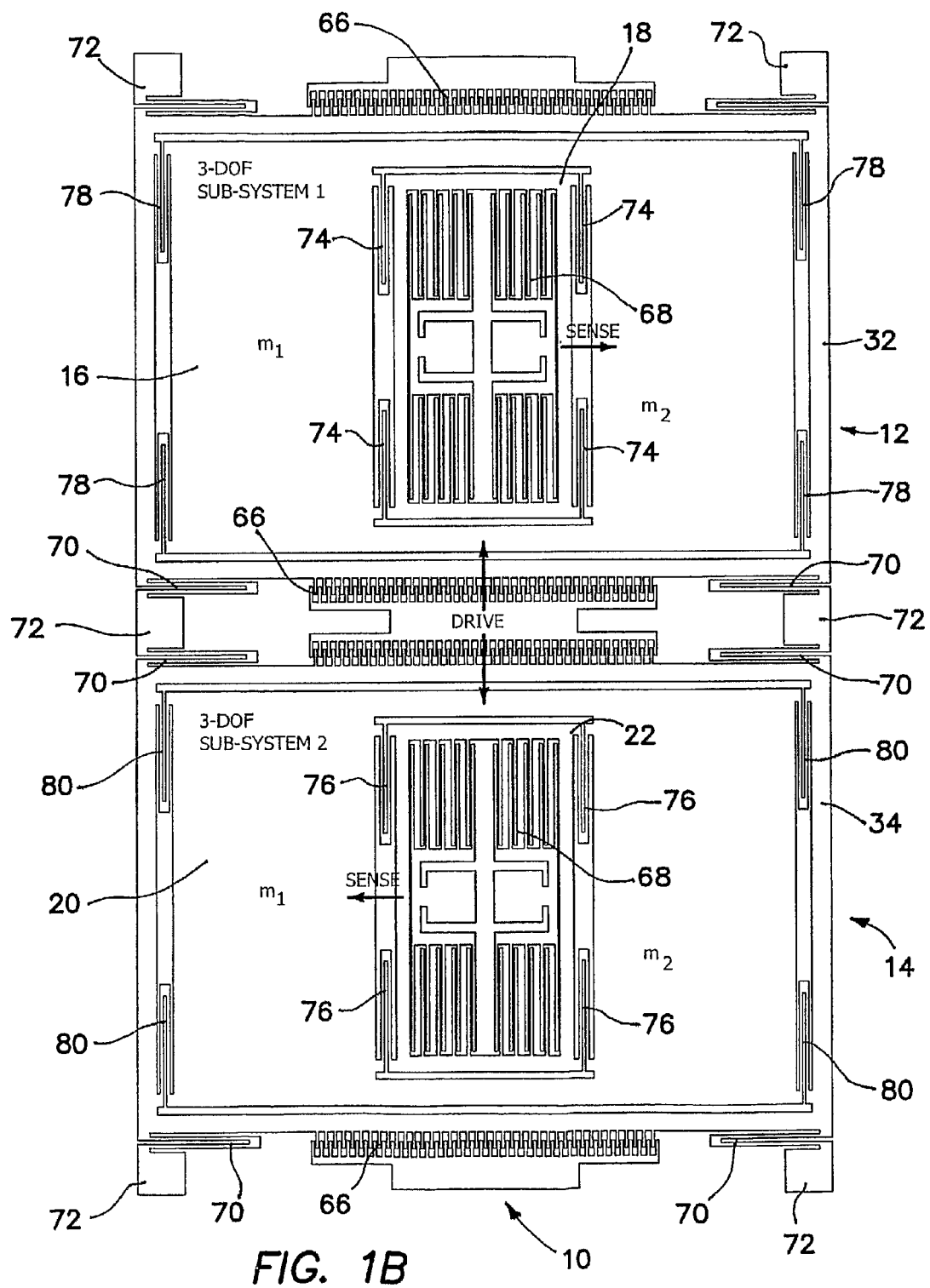
FIG. 1b is a layout diagram of a second embodiment for a gyroscopic system of the invention in which the two gyroscopic subsystems are mechanically uncoupled.
Figure 1C:
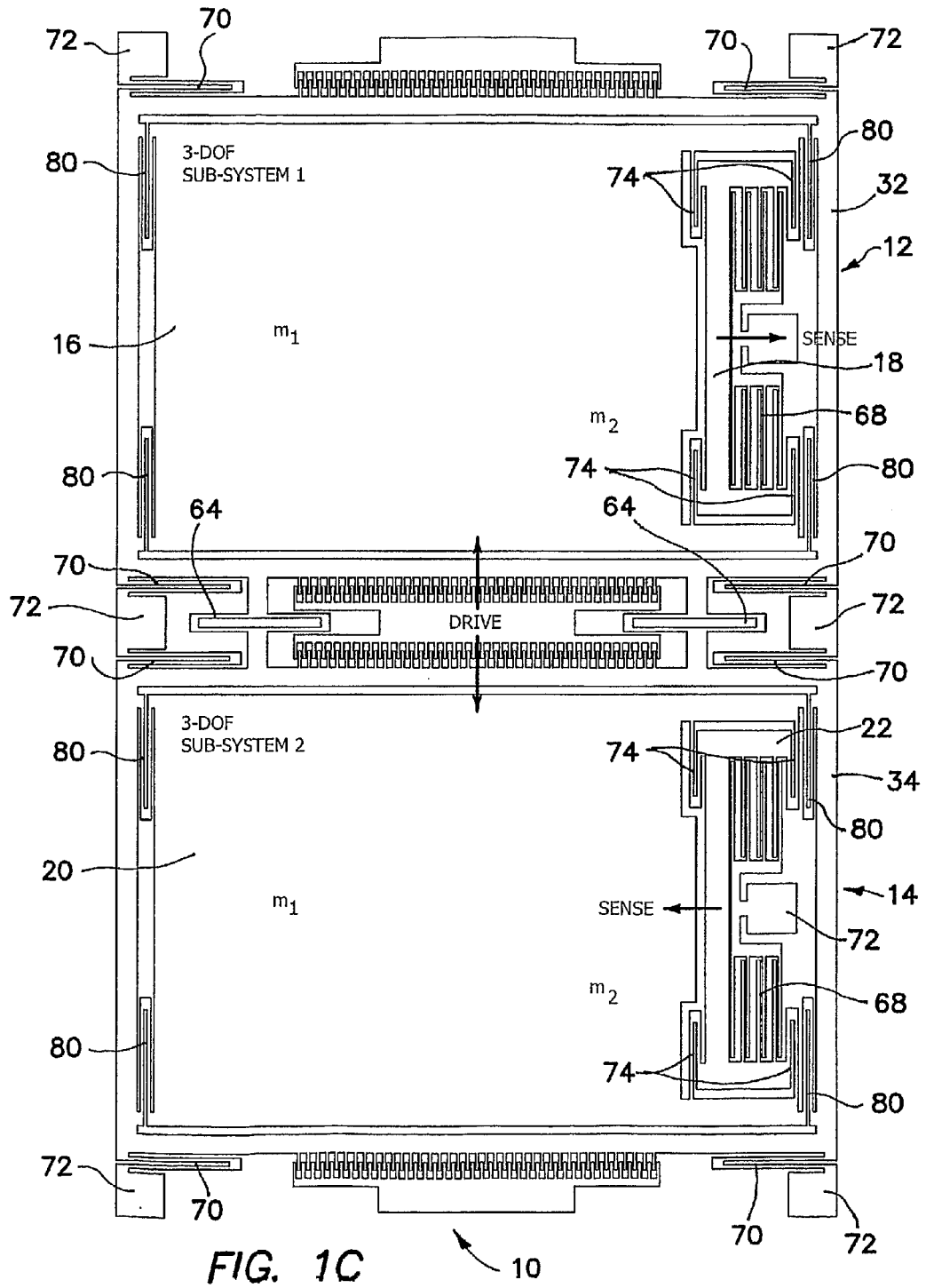
FIG. 1c is a layout diagram of a third embodiment for a gyroscopic system of the invention in which the smaller masses, $m_2$, are positioned to the side of the side of the larger masses $m_1$ so that the detection electrode pads are on a die edge instead of being central to the die as in the embodiments of FIGS. 1a and 1b.

For a z-axis gyroscope implementation as illustrated, lateral comb structures of FIGS. 1a-1c are employed in the in-plane drive direction to provide the input driving force as well as to allow for drive amplitude sensing for feedback control. Parallel plate in-plane sensing of FIGS. 1a-1c is utilized for detection of the sense mode motion of the second mass due to a z-axis input angular rate.

For x or y-axis gyroscope implementations, the drive or sense oscillations could be out-of-plane, still forming two coupled 3-DOF systems. The total number of dynamical subsystems serially coupled together and utilized in the drive direction may be increased beyond two subsystems for the purpose of improving the frequency response and/or amplifying the anti-phase motion. Also, each sense system may comprise two or more masses for the purpose of enhancing the sense mode frequency response characteristics. Additions to both the drive and sense systems are logical extensions and are considered to be within the scope of the current invention.

The gyroscope and accelerometer function of device 10 can be combined. Since the approach of the illustrated embodiment eliminates the need of mechanical coupling in the sense mode and allows in-phase motion in the sense-mode (i.e. in the same direction), it is ideal for simultaneous acceleration detection. When the two gyroscopic subsystems 12, 14 are driven anti-phase, the Coriolis forces induced on the two gyroscopic subsystems 12, 14 are in the opposite directions. Thus, the Coriolis response of the two sense oscillators 28, are in opposite directions. For the measurement of input angular rate, the difference of the response of the two sense oscillators 28, 30 is detected. This provides for cancellation of common-mode stimuli such as external acceleration input, since such stimuli result in a response in the same direction. Even though external acceleration input is rejected as common mode by detection electronics, the mechanical response still exists. By adding the response of the two 2-DOF sense-mode oscillators 28, 30 in a detection circuit, instead of differencing them, acceleration along the sense-axis can be detected. Therefore, it should be understood that wherever in the claims or in this specification reference is made to a gyroscope or gyroscopic function that it is to be understood that the invention contemplates including an accelerometer or accelerometric function as well.

Figure 9:
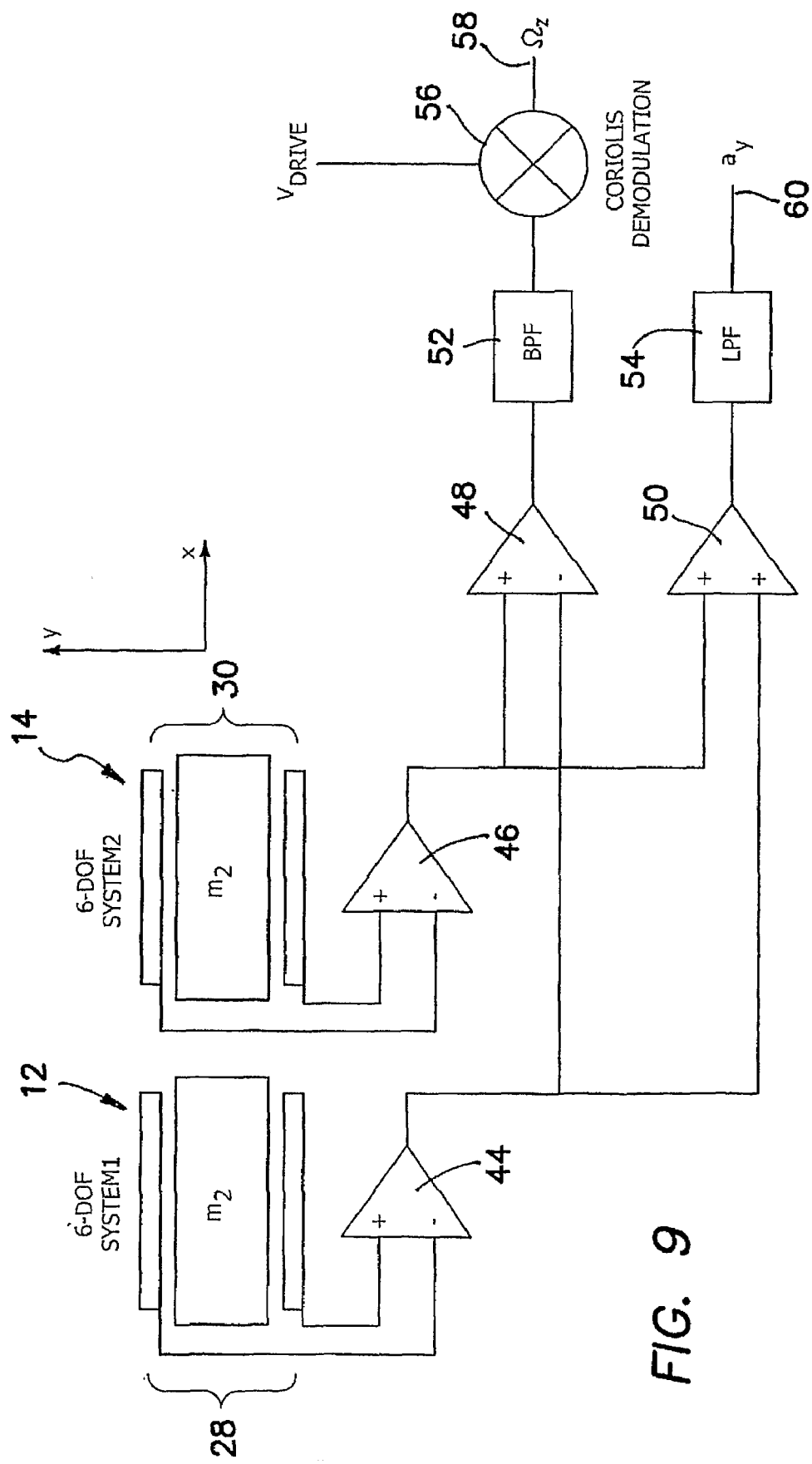
FIG. 9 is a schematic for providing simultaneous acceleration and angular rate detection, using the same electrodes attached to the small masses.
Figure 10:
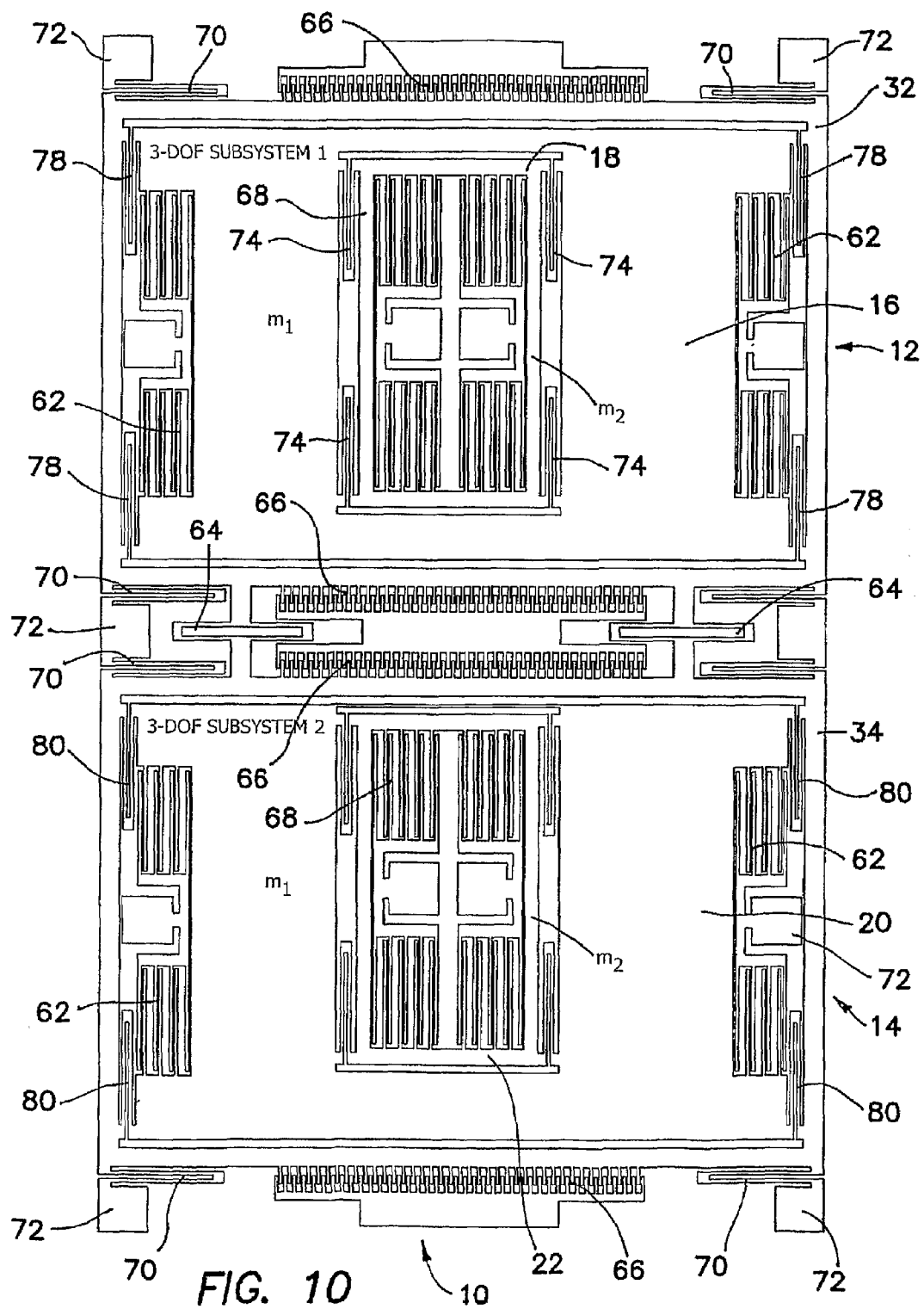
FIG. 10 is a layout diagram of the multi-DOF tuning fork gyroscope, of another embodiment showing electrodes used for simultaneous acceleration detection.

For example, the responses of the sense-mode oscillators 28, 30 are generated in differential amplifiers 44 and 46 respectively, added in summing circuit 50 and low-pass filtered by filter 54 to provide acceleration detection, $a_y$, at output 60, while the difference from subtraction circuit 48 of the responses is band pass filtered by filter 52 and amplitude demodulated by demodulator 56 at the drive frequency to provide simultaneous rate detection at output 58 as schematically shown in FIG. 9. If it is desired to utilize separate electrodes for detection of acceleration, electrodes 62 may be attached to the larger mass $m_1$ of each 2-DOF oscillator 28, 30 as in FIG. 10.

Figure 11A:
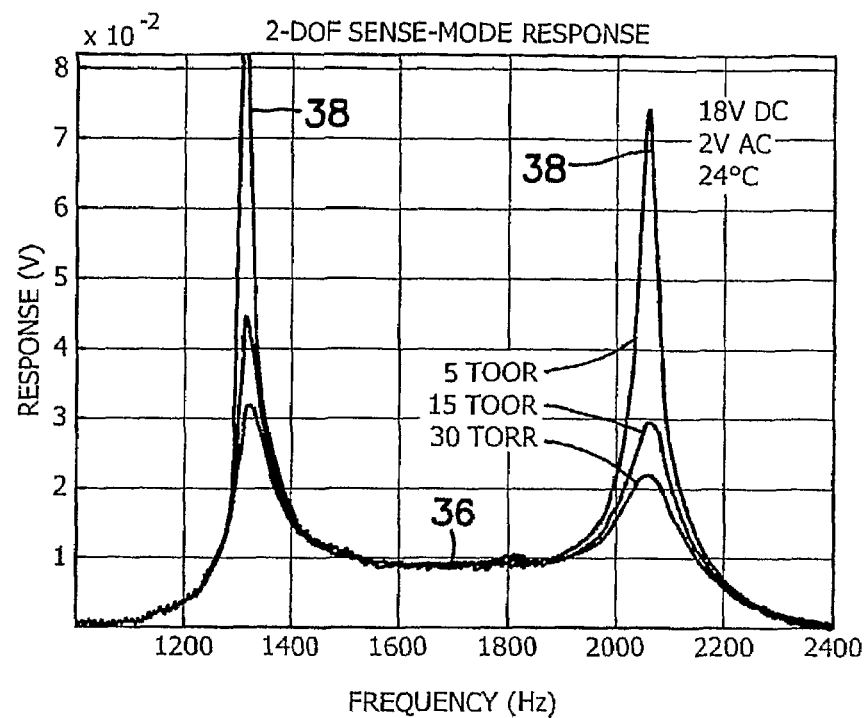
FIG. 11 is a pair of graphs showing the frequency response of a prototype 2-DOF oscillator according to the invention under pressure variations. The left graph shows amplitude as a function of frequency and the right graph shows phase as a function of frequency.
Figure 11B:
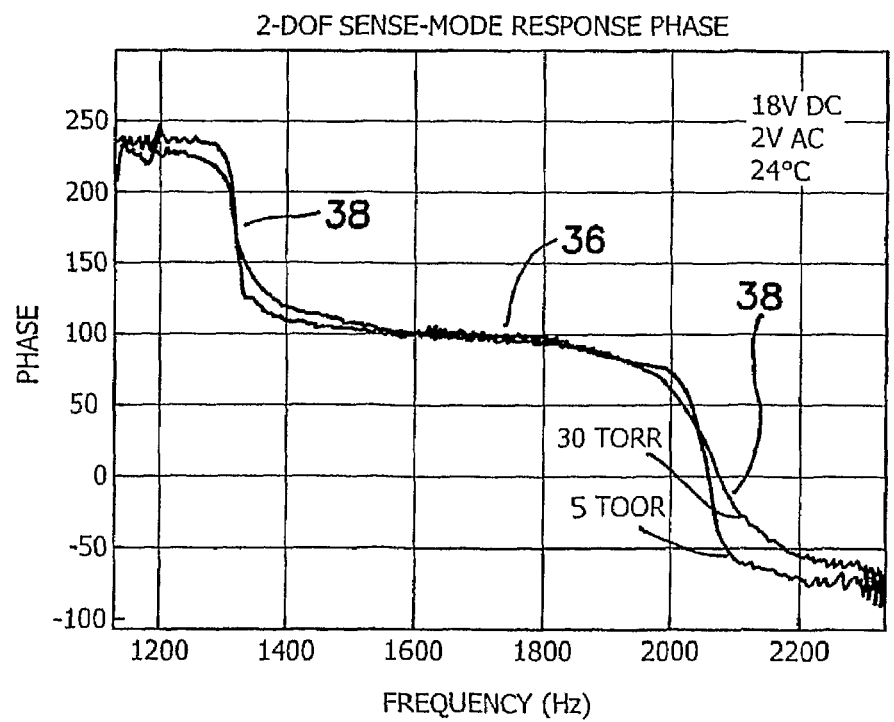
Figure 12:
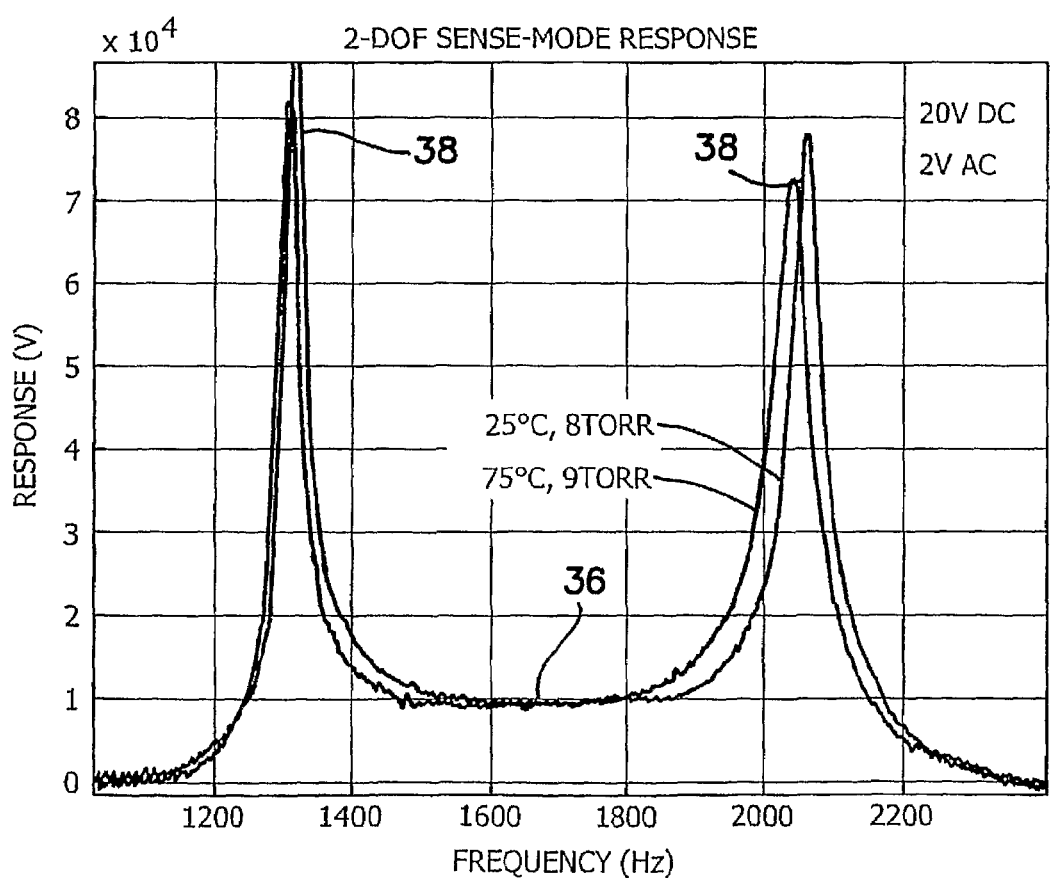
FIG. 12 is a graph showing the frequency response of a prototype 2-DOF oscillator according to the invention under temperature variations. The graph shows amplitude as a function of frequency.

Consider now some supporting experimental results. The frequency response of a bulk-micromachined prototype 2-DOF oscillator 28, 30 has been electrostatically characterized under various temperature and pressure conditions. The flat range 36 in the frequency response has been successfully demonstrated, where the amplitude and phase of the response is constant as shown in the amplitude and phase graphs of FIG. 11 for varying pressure conditions. FIG. 12 presents the frequency response of the 2-DOF oscillator for varying temperature conditions. The response amplitude and phase are observed to change abruptly around the resonance peaks 38, but remained constant within the flat range 36. The amplitude and phase of the response were observed to vary drastically with these environmental variations close to the resonant frequency 38. However, within the flat range 36, both the amplitude and phase of the response were experimentally demonstrated to remain constant. The location of the resonance peaks 38 were observed to vary with temperature. The response amplitude and phase remained constant within the flat range 36.

In summary, it can now be appreciated that the invention disclosed is a device or gyroscope 10 whose main purpose is to measure the rotational rate of objects. Specifically, the design differs from existing gyroscope designs in that the illustrated embodiment contains two identical gyroscopic subsystems 12 and 14, each with an overall 3-DOF dynamical system. Each of the 3-DOF gyroscopic subsystems 12 and 14 comprises two proof masses 16, and 18, 20 and 22 respectively that form a 2-DOF sense-mode oscillator 24 and 26 respectively and 1-DOF drive-mode oscillator 28 and 30. In each of the two gyroscopic systems 12 and 14, the 2-DOF sense-mode oscillator 24, 26 is constrained to oscillate together with the decoupling frame 32 and 34 respectively in the drive-mode (y direction). The 2-DOF sense-mode oscillator 24 and 26 are comprised of the two proof masses 16, and 18, 20 and 22, the decoupling frame 32 and 34 and related springs and dampeners respectively. Thus, each of the two gyroscopic subsystems 12 and 14 becomes collective 1-DOF in the drive-mode oscillator 28 and 30 (x direction) respectively.

The anti-phase multi-DOF gyroscope system 10 of the illustrated embodiment eliminates the above problem by utilizing two separate 2-DOF sense-mode oscillators 24 that are operated in the gain and phase stable ranges of their frequency response. Thus, parameter fluctuations that result in resonance frequency shifts do not affect the sense-mode amplitude and phase of the two gyroscopic systems 12, 14. The resulting dynamical system ensures that the sense-mode response of the two gyroscopic systems 12, 14 are precisely anti-phase with equal amplitude, even in the presence of fabrication imperfections and environmental variations.

Second, the two 3-DOF gyroscopic subsystems 12, 14 are mechanically coupled to each other in the drive-mode via suspension beams 64 in FIG. 1a; thereby making the drive mode of the overall device 10 a 2-DOF coupled dynamic system. Uncoupled drive-mode operation is also possible by regulating the drive oscillations of each subsystem 12, 14 independently by elimination of suspension beams 64 as shown in layout diagram of device 10 in FIG. 1b. FIG. 1c is a layout diagram of still another embodiment of device 10 in which the smaller masses, $m_2$, are positioned to the side of the side of the larger masses $m_1$ so that the detection electrode pads are on a die edge instead of being central to the die as in the embodiments of FIGS. 1a and 1b.

Third, the 3-DOF gyroscopic subsystems 12, 14 utilize 2-DOF sense-mode oscillators 28, 30, which provide improved robustness against fabrication imperfections and environmental variations. The 2-DOF sense-mode oscillators 28, 30 provide a gain and phase stable range 36 in the sense-mode frequency response, unlike conventional tuning-fork gyroscope architectures with 1-DOF sense-mode oscillators.

Fourth, each 2-DOF sense-mode oscillator 28, 30 is suspended inside a decoupling frame 32, 34 respectively to mechanically decouple the drive and sense motions. This precisely aligns the drive-mode oscillations with the designed drive direction, and minimizes the quadrature error that originates from undesired transfer of the drive-mode oscillations into the sense-mode.

Fifth, in the drive-mode, the overall device 10 is nominally driven at the anti-phase resonant frequency of the 2-DOF drive oscillator 24, 26. Thus, the two gyroscopic subsystems 12, 14 oscillate in opposite directions in drive direction.

Sixth, the 2-DOF sense oscillators 28, 30 of each of the two gyroscopic subsystems 12, 14 are designed identically, so that gain stable and phase stable ranges of each 2-DOF system 12, 14 overlap. The anti-phase drive mode is designed to be located within the overlapping flat ranges 36. Thus, when the device 10 is driven at the anti-phase drive resonance mode, the operation frequency is within both of the flat ranges 36 of the 2-DOF sense-mode oscillators 28, 30, even in the presence of imperfections.

Seventh, since the response amplitude and phase are constant in the flat ranges 36 of both 2-DOF sense-mode oscillators 28, 30, the sense-mode amplitude and phase of the two sense-mode oscillators 28, 30 can be precisely matched without mechanical coupling in the sense-mode. This assures a proper anti-phase operation in the sense-mode, allowing differential detection to effectively reject common-mode stimuli.

Eighth, since this approach eliminates the need of mechanical coupling in the sense mode and allows in-phase motion in the sense-mode (i.e. in the same direction), it is ideal for simultaneous acceleration detection. If it is desired to utilize separate electrodes for detection of acceleration, electrodes 64 may be attached to the larger mass of each 2-DOF oscillator.

Many alterations and modifications may be made by those having ordinary skill in the art without departing from the spirit and scope of the invention. Therefore, it must be understood that the illustrated embodiment has been set forth only for the purposes of example and that it should not be taken as limiting the invention as defined by the following invention and its various embodiments.

Therefore, it must be understood that the illustrated embodiment has been set forth only for the purposes of example and that it should not be taken as limiting the invention as defined by the following claims. For example, notwithstanding the fact that the elements of a claim are set forth below in a certain combination, it must be expressly understood that the invention includes other combinations of fewer, more or different elements, which are disclosed in above even when not initially claimed in such combinations. A teaching that two elements are combined in a claimed combination is further to be understood as also allowing for a claimed combination in which the two elements are not combined with each other, but may be used alone or combined in other combinations. The excision of any disclosed element of the invention is explicitly contemplated as within the scope of the invention.

The words used in this specification to describe the invention and its various embodiments are to be understood not only in the sense of their commonly defined meanings, but to include by special definition in this specification structure, material or acts beyond the scope of the commonly defined meanings. Thus if an element can be understood in the context of this specification as including more than one meaning, then its use in a claim must be understood as being generic to all possible meanings supported by the specification and by the word itself.

The definitions of the words or elements of the following claims are, therefore, defined in this specification to include not only the combination of elements which are literally set forth, but all equivalent structure, material or acts for performing substantially the same function in substantially the same way to obtain substantially the same result. In this sense it is therefore contemplated that an equivalent substitution of two or more elements may be made for any one of the elements in the claims below or that a single element may be substituted for two or more elements in a claim. Although elements may be described above as acting in certain combinations and even initially claimed as such, it is to be expressly understood that one or more elements from a claimed combination can in some cases be excised from the combination and that the claimed combination may be directed to a subcombination or variation of a subcombination.

Insubstantial changes from the claimed subject matter as viewed by a person with ordinary skill in the art, now known or later devised, are expressly contemplated as being equivalently within the scope of the claims. Therefore, obvious substitutions now or later known to one with ordinary skill in the art are defined to be within the scope of the defined elements.

The claims are thus to be understood to include what is specifically illustrated and described above, what is conceptionally equivalent, what can be obviously substituted and also what essentially incorporates the essential idea of the invention.

We claim:

1. An apparatus with six degrees of freedom and driven in anti-phase for passive relaxation of sense mode phase matching requirements comprising:
   a first and second three degree-of-freedom (3-DOF) subsystem coupled with each other in a drive-mode and driven into anti-phase oscillation to substantially reject common-mode stimuli,
   where each of the first and second 3-DOF subsystems comprise two proof masses and a decoupling frame, the two proof masses in each 3-DOF subsystem being collectively arranged and configured to function as both a 1-DOF drive oscillator and 2-DOF sense oscillator,
   where in each of the first and second 3-DOF subsystems the 1-DOF drive oscillator and 2-DOF sense oscillator are mechanically decoupled from each other and a substrate via the decoupling frame,
   where the two 1-DOF drive oscillators in the first and second 3-DOF subsystems are coupled with each other to collectively function as a 2-DOF coupled system and to provide a common anti-phase drive-mode resonant frequency at which the first and second 3-DOF subsystems oscillate in opposite directions,
   and where the two 2-DOF sense-mode oscillators in the first and second 3-DOF subsystems each provide a flat range in frequency response where the response gain and phase are stable to provide robustness to imperfections and environmental influences, and to provide matching of sense-mode amplitude and phase of the first and second 3-DOF subsystems.

2. The apparatus of claim 1 further comprising a mechanical flexure and where the two 1-DOF drive oscillators in the first and second 3-DOF subsystems are coupled with each other through the mechanical flexure.

3. The apparatus of claim 1 where the two 1-DOF drive oscillators in the first and second 3-DOF subsystems are coupled with each other through regulation of the two 1-DOF drive oscillators.

4. The apparatus of claim 1 further comprising sense electrodes in each of the first and second 3-DOF subsystems and where the sense electrodes are positioned in a central location within the first and second 3-DOF subsystems.

5. The apparatus of claim 1 further comprising a substrate with an edge, where the first and second 3-DOF subsystems are disposed on the substrate, further comprising sense electrodes in each of the first and second 3-DOF subsystems, and where the sense electrodes are positioned proximate the substrate edge.

6. The apparatus of claim 1 where the two 2-DOF sense-mode oscillators in the first and second 3-DOF subsystems are arranged configured so that the flat range in the frequency response of the two 2-DOF sense-mode oscillators have overlapping frequency ranges.

7. The apparatus of claim 6 where the common anti-phase drive-mode resonant frequency of the two 1-DOF drive oscillators in the first and second 3-DOF subsystems, functioning as a 2-DOF coupled system, is within the overlapping frequency ranges of the two 2-DOF sense-mode oscillators in the first and second 3-DOF subsystems.

8. An anti-phase six degree-of-freedom tuning fork gyroscope system comprising:
   a first three degree-of-freedom gyroscope subsystem; and a second three degree-of-freedom gyroscope subsystem,
where the first and second gyroscope subsystems each comprise two proof masses mechanically coupled together and mechanically restrained in each gyroscope subsystem to form a two degree-of-freedom sense mode oscillator in each gyroscope subsystem, and each of the two proof masses mechanically restrained in the first and second gyroscope subsystems to function as a one degree-of-freedom drive mode oscillator so that the four proof masses function overall as a two degree-of-freedom drive mode oscillator having two primary resonance modes, namely an in-phase and anti-phase mode;
drive means for driving the two degree-of-freedom drive mode oscillator in the anti-phase mode at an anti-phase resonant frequency, and
where each of the two degree-of-freedom sense mode oscillators is characterized by a flat frequency response range and where the anti-phase resonant frequency is within the flat frequency response ranges of the sense mode oscillators where response gain and phase are stable.

9. The system of claim 8 further comprising:
a first frame mechanically coupled to at least one of the two proof masses in the first gyroscope subsystem;
a second frame mechanically coupled to at least one of the two proof masses in the second gyroscope subsystem,
where the first and second frames are mechanically coupled to a substrate and mechanically restrained in the first and second gyroscope subsystems respectively.

10. The system of claim 9 where the two proof masses in the first and second gyroscope subsystems are mechanically restrained to move only in a sense direction, and where the first and second frames are mechanically restrained to move only in a drive direction.

11. The system of claim 10 where the sense direction and drive direction are in orthogonal directions in a common plane.

12. The system of claim 8 where the flat frequency response ranges of the two degree-of-freedom sense mode oscillators overlap.

13. The system of claim 12 where the flat frequency response ranges of the two degree-of-freedom sense mode oscillators are substantially identical.

14. The system of claim 8 where the first and second gyroscope subsystems are fabricated in a common plane and where drive or sense oscillations are directed out-of-plane for out-of-plane gyroscope implementations.

15. The system of claim 8 further comprising additional gyroscope subsystems mechanically serially coupled to the first subsystem, second subsystem or to each other in order to improve the frequency response or amplify anti-phase motion.

16. The system of claim 8 where each two degree-of-freedom sense mode oscillator comprises additional proof masses to enhance sense mode frequency response characteristics, all of the proof masses being at least indirectly coupled together.

17. The system of claim 8 where each one degree-of-freedom drive mode oscillator and two degree-of-freedom sense mode oscillator comprises additional proof masses, all of the proof masses being at least indirectly coupled together.

18. The system of claim 8 further comprising accelerometer means for coupled to the two degree-of-freedom sense mode oscillators for generating a measurement of acceleration.

19. The system of claim 18 where the accelerometer means comprises separate acceleration sense electrodes coupled to at least one of the proof masses in each two degree-of-freedom sense mode oscillator.

20. The system of claim 18 where the accelerometer means comprises a circuit for adding responses of the two degree-of-freedom sense mode oscillators and generating a measure of acceleration therefrom.

21. A method of operating a gyroscope with six degrees of freedom comprising:
driving a 1-DOF drive oscillator in each of a first and second three degree-of-freedom (3-DOF) gyroscope systems, which 1-DOF drive oscillators in the first and second 3-DOF systems are coupled with each other to collectively function as a 2-DOF coupled system and to provide a common anti-phase drive-mode resonant frequency at which the first and second 3-DOF subsystems oscillate in opposite directions to substantially reject common-mode stimuli,
sensing a rate of angular rotation by means of a 2-DOF sense oscillator in each of a first and second three degree-of-freedom (3-DOF) gyroscope systems, each 2-DOF sense oscillator providing a flat range in its frequency response where the response gain and phase are stable to provide robustness to imperfections and environmental influences, and to provide matching of sense-mode amplitude and phase of the first and second 3-DOF subsystems; and
decoupling the 1-DOF drive oscillator and the 2-DOF sense oscillator from each other and from a substrate in each of the first and second three degree-of-freedom (3-DOF) gyroscope systems.

22. The method of claim 21 where driving the coupled 1-DOF drive oscillators in each of the first and second three degree-of-freedom (3-DOF) gyroscope systems comprises driving the 1-DOF drive oscillators coupled together by a mechanical flexure.

23. The method of claim 21 where driving the coupled 1-DOF drive oscillators in each of the first and second three degree-of-freedom (3-DOF) gyroscope systems comprises driving the 1-DOF drive oscillators coupled with each other through regulation of the two 1-DOF drive oscillators.

24. The method of claim 21 where sensing the rate of angular rotation comprises sensing the rate of angular rotation by means of sense electrodes in each of the first and second 3-DOF systems positioned in a central location within the first and second 3-DOF systems.

25. The method of claim 21 where the gyroscope is fabricated on a substrate with at least one edge and where sensing the rate of angular rotation comprises sensing the rate of angular rotation by means of sense electrodes in each of the first and second 3-DOF systems positioned proximate the substrate edge.

26. The method of claim 21 where sensing the rate of angular rotation comprises providing the 2-DOF sense-mode oscillators with a flat range in frequency response and sensing in the flat range in the frequency response of the 2-DOF sense-mode oscillators.

27. The method of claim 26 where driving the 1-DOF drive oscillator in each of the first and second three degree-of-freedom (3-DOF) gyroscope systems comprises driving the 1-DOF drive oscillator at the common anti-phase drive-mode resonant frequency within overlapping flat frequency ranges of the 2-DOF sense-mode oscillators.

28. A method of operating an anti-phase six degree-of-freedom tuning fork gyroscope system comprising:

driving a first three degree-of-freedom gyroscope subsystem; and driving a second three degree-of-freedom gyroscope subsystem in an anti-phase mode with the first three degree-of-freedom gyroscope subsystem at an anti-phase resonant frequency; and sensing motion by means of the first and second three degree-of-freedom gyroscope subsystems in a flat frequency response range where the anti-phase resonant frequency is within the flat frequency response ranges where response gain and phase are stable.

29. The method of claim 28 further comprising mechanically decoupling sensing motion from driving the first and second three degree-of-freedom gyroscope subsystems.

30. The method of claim 29 where sensing motion comprises mechanically restraining two proof masses in the first and second gyroscope subsystems to move only in a sense direction, and driving the first and second gyroscope subsystems comprises mechanically restraining the first and second gyroscope subsystems to move only in a drive direction.

31. The method of claim 30 where mechanically restraining two proof masses in the first and second gyroscope subsystems to move only in a sense direction, and driving the first and second gyroscope subsystems comprises mechanically restraining the first and second gyroscope subsystems to move only in a drive direction comprises mechanically restraining motion in the sense direction and the drive direction to orthogonal directions in a common plane.

32. The method of claim 28 where sensing motion in the flat frequency response ranges of the first and second three degree-of-freedom gyroscope subsystems comprises sensing motion in a range of overlap in the frequency response ranges of the first and second three degree-of-freedom gyroscope subsystems.

33. The method of claim 32 where sensing motion in a range of overlap comprises sensing motion in a range of substantially identical frequency response ranges.

34. The method of claim 28 where the first and second gyroscope subsystems are fabricated in a common plane and where driving the first and second gyroscope subsystems or sensing motion is directed out-of-plane for out-of-plane gyroscope implementations.

35. The method of claim 28 further comprising driving additional gyroscope subsystems mechanically serially coupled to the first subsystem, the second subsystem or to each other in order to improve the frequency response or amplify anti-phase motion.

36. The method of claim 28 where sensing motion comprises sensing motion by means of additional three degree-of-freedom gyroscope subsystems to enhance sense mode frequency response characteristics, all of the three degree-of-freedom gyroscope subsystems being at least indirectly coupled together.

37. The method of claim 28 further comprising sensing acceleration by means of adding output response signals from each gyroscope subsystem.

38. The method of claim 37 where sensing acceleration comprises sensing the output response signals through separate acceleration sense electrodes coupled to at least one proof mass in each gyroscope subsystem.

39. The method of claim 37 where sensing acceleration comprises adding responses of a plurality of sense mode oscillators in a detection circuit and generating a measure of acceleration therefrom.

* * * * *